Patented May 4, 1943

2,317,986

UNITED STATES PATENT OFFICE 2,317,986

COMPOSITION OF MATTER

Lawrence H. Flett, Hamburg, N. Y., assignor to Allied Chemical Dye Corporation, a corporation of New York No Drawing. Application July 8, 1940, Serial No. 344,379

15 Claims. (Cl. 260—505)

The present invention relates to compositions of matter which are valuable emulsifying and cleaning agents, particularly when used in dry cleaning, and to a process for the production of such compositions of matter.

It is an object of the invention to provide novel compositions of matter which are valuable emulsifying and cleaning agents and which are particularly useful as dry cleaning aids. Another object of the invention is to provide a process for the manufacture of compositions of matter having excellent emulsifying and cleaning properties, which process can be carried out efficiently on a commercial scale. Other objects of the invention will in part be obvious and will in part appear hereinafter.

It has been discovered in accordance with the present invention that by halogenating a liquid petroleum fraction which is relatively free from aromatic bodies, and most of which (i. e., at least 80 per cent) boils within the range from 195° to 295° C. at 15 mm. absolute pressure, so as to form a mixture containing halogen derivatives of the hydrocarbons of the petroleum fraction, usually together with some unhalogenated hydrocarbons, condensing resulting mixed halides with a mononuclear aromatic compound such as benzene or phenol, preferably in the presence of a condensation catalyst for reactions of the Friedel-Crafts type, and sulfonating resulting mixed nuclearly substituted aromatic compounds, valuable compositions of matter are obtained comprising mixtures of aromatic sulfonates containing as nuclear substituents residues of aliphatic and alicyclic hydrocarbons present in the petroleum fraction.

These compositions of matter in the form of the free sulfonic acids and their salts, especially the latter, have been found to be valuable dry cleaning aids and excellent emulsifying agents, being particularly well adapted for producing water-in-oil emulsions. The mixtures of aromatic sulfonates possess relatively low solubility in water but possess relatively high solubility in solvents employed in dry cleaning such as, for example, Stoddard solvent, trichlorethylene, carbon tetrachloride, etc. When they are to be used for certain purposes, for example in dry cleaning, the compositions preferably contain, in addition to the mixed aromatic sulfonates, a proportion of the petroleum fraction used in the process. Compositions of this nature dissolve rapidly in organic solvents such as the solvents used in dry cleaning.

The petroleum fractions adapted for use in the present process are those obtainable by distillation from petroleum crudes and are known, particularly when in purified form—the form in which they are preferably used in the present process—as white oils or liquid paraffins. The petroleum oils suitable for the production of the compositions of this invention are composed predominantly of saturated aliphatic hydrocarbons (including straight and branched-chain compounds of varied structures), and alicyclic hydrocarbons of varying numbers of carbon atoms and preferably their content of aromatic hydrocarbons should be less than 5 per cent. From their boiling points and other physical properties, they are considered to consist predominantly of hydrocarbons containing 20 to 30 carbon atoms with an average carbon content of 20 to 28 carbon atoms.

On halogenating a petroleum fraction of this class, condensing the resulting halogenated compositions with a mononuclear aromatic compound in the presence of a catalyst of the Friedel-Crafts type, and sulfonating the resulting mixed substituted aromatic compounds, mixed aromatic sulfonates are produced which differ from one another chiefly with respect to the alkyl and/or cycloalkyl residues contained therein. Being mixtures of alkylated and/or cycloalkylated aryl sulfonates in which the alkyl and/or cycloalkyl residues are of varying carbon content and structure, the compositions of the invention possess properties adapting them for use for divergent purposes.

Any suitable mononuclear aromatic compounds may be employed in the production of the compositions of the present invention. For example, the aromatic compounds employed may be hydrocarbons or they may contain non-hydrocarbon substituents. Among the substituents which may be present in the compounds are hydroxyl, halogen, alkoxy, dialkylamino and carboxyl (in the free acid or ester form) groups. As examples of such compounds there may be mentioned benzene, toluene, salicyclic acid, phenetole, chlorbenzene and phenol. The preferred compositions are prepared with the use of benzene or phenol.

In practicing the present process in accordance with a preferred manner of proceeding, the selected petroleum fraction is reacted with a halogenating agent such as chlorine or bromine so as to form a substantial proportion of monohalides. The extent of halogenation may be varied over relatively wide limits depending principally upon the use to which the final composition is to be put. As a feature of the invention it has been found that the mixed products obtainable by incompletely halogenating the petroleum fraction, condensing the resulting mixed halides with an aromatic compound while retaining in the reaction mixture unhalogenated hydrocarbon material initially employed, and sulfonating the resulting condensation product and converting the sulfonation product to a salt thereof while still retaining in the composition said hydrocarbon material, are of especial value for use in the production of water-in-oil emulsions and as dry cleaning aids. The extent to which the halogenation is carried out has an important effect upon the amount of unhalogenated hydrocarbons which will appear in the final product. For example, by directly halogenating the petroleum fraction until the resulting mixture contains an amount of organically combined halogen which is less than that required theoretically for dihalogenation of all the hydrocarbons which constitute the petroleum fraction, a part of the mass of hydrocarbons is not halogenated and the final mixture thus contains a considerable proportion of unhalogenated hydrocarbons. In the usual case, satisfactory results are obtained if a stream of chlorine gas is passed into the petroleum fraction at 50° to 100° C. in the presence of actinic light or a catalyst until the mixture contains an amount of organically combined chlorine equal to about one and a quarter times that theoretically required for monochlorination of all of the hydrocarbons in the petroleum fraction. However, if it is desired to obtain a final product containing a relatively high proportion of unhalogenated hydrocarbons, the chlorination may be continued only until the mixture contains an amount of organically combined chlorine equal to that theoretically required for monochlorination, or considerably less than this amount. The presence of the unhalogenated hydrocarbons in the reacting masses of the process is advantageous because these hydrocarbons act as diluents and make the reacting masses fluid so that the reactions proceed smoothly and uniformly.

In regard to the halogenation step of the present process, those skilled in the art will recognize that there will usually be formed, in addition to monochlorides, a proportion of higher chlorides. For this reason, the alkyl and/or cycloalkyl residues in the final products in many cases may contain halogen atoms as substituents.

After the halogenation has been completed, the halogenated batch is mixed with the aromatic compound and a catalyst for reactions of the Friedel-Crafts type, for example aluminum chloride when the aromatic compound is a hydrocarbon or zinc chloride when the aromatic compound is a phenol, and the resulting mixture is maintained at a temperature adapted to cause condensation to take place between the alkyl halides and/or cycloalkyl halides of the halogenated petroleum fraction and the aromatic compound. As a result of the condensation reaction there is obtained a mixture comprising mixed alkyl and/or cycloalkyl-substituted aromatic compounds, unattacked hydrocarbons, and a tarry material comprising the catalyst. This mixture is permitted to stand until it separates into two layers; and the upper layer, which contains the mixed substituted aromatic compounds, is recovered. The upper layer preferably is then distilled to remove unreacted aromatic compound, which is preferably collected for reuse in the process. The mixture remaining comprises chiefly aromatic compounds containing as nuclear substituents residues derived from the aliphatic and alicyclic hydrocarbons present in the petroleum fraction. (For convenience such substituted aromatic compounds will be referred to hereinafter as "alkyl" aromatic compounds.) The remaining mixture may be sulfonated directly with a suitable sulfonating agent such as, for example, sulfuric acids of various strengths (e. g., 66° Bé. sulfuric acid, sulfuric acid monohydrate, oleum), chlorsulfonic acid, etc., followed by neutralization with a suitable alkaline material. (It is to be noted that the term "neutralization" is employed herein in the board sense to mean conversion of the sulfonic acids to salts the aqueous solutions of which may or may not have a pH of 7.) Where the mixed alkyl aromatic sulfonates are to be used as dry cleaning aids, the sulfonation may be carried out in the presence of a dry cleaning solvent which is not readily sulfonated, such as Stoddard solvent, carbon tetrachloride, dichlorethane, tetrachlorethane, dichlorbenzene, etc. In the latter case, the resulting sulfonated mass after neutralization preferably is diluted with a proportion of water to form a paste which is excellently adapted for use in dry cleaning.

The neutralization of the aromatic sulfonates with an aqueous solution of an alkaline material results in the formation of an aqueous solution or suspension which may be used as such or may be dried to form a dry composition. For many purposes for which the present compositions are adapted to be used, the presence of unattacked hydrocarbons and/or dry cleaning solvents is desirable in order to provide an oily paste which dissolves readily in organic solvents. If desired, the aromatic sulfonates may be obtained in the form of aqueous solutions or suspensions or in dry form.

One way of obtaining the aromatic sulfonates in solid dry form, and relatively free from other organic materials, is to remove unattacked and unsulfonatable hydrocarbons from the crude condensation product from which the mixture of alkyl aromatic sulfonates is made.

When a petroleum fraction, which serves as the source of the nuclear substituents, has a wide boiling range, the unreacted and unsulfonatable hydrocarbons, as well as the alkyl aromatic compounds which are present in the condensation reaction mass and which are derived from the petroleum fraction, have overlapping boiling ranges, so that their separation by fractional distillation is practically impossible. By selecting a petroleum fraction which has a narrow boiling range, the overlapping between the boiling ranges of unreacted and unsulfonatable hydrocarbons and the boiling range of the desired alkyl aromatic compounds in the condensation mass can be greatly reduced and even eliminated, thereby enabling the sulfonatable alkyl aromatic compounds to be separated by fractional distillation, more or less completely—depending upon the boiling range of the selected petroleum fraction—from the undesired unattacked and unsulfonatable hydrocarbons. A petroleum fraction of which at least 80 per cent boils within a temperature range of 40 degrees centigrade and preferably within a range of 30 degrees centigrade is well suited for the chlorination and condensation reactions hereinbefore described, to form a mixture from which the desired, mixed, alkyl aromatic compounds may be separated, by fractional distillation, as a distillate which contains a comparatively small amount of unattacked and unsulfonatable hydrocarbons. The distillate so obtained may be sulfonated and converted by suitable neutralization to an aqueous solution of mixed alkyl aryl sulfonates which can be recovered by evaporation to dryness of the solution in any usual manner in a dry, solid form and relatively free from other organic materials.

When the boiling range of the mixed alkyl aromatic compounds and that of the petroleum distillate from which the said compounds are made, overlap to such an extent that separation by fractional distillation of the said aromatic compounds from unsulfonatable hydrocarbons in the condensation mixture is impractical, a solid dry mixture of alkyl aromatic sulfonates may be recovered by preparing a mixture of neutralized alkyl aromatic sulfonates in the usual manner from the condensation mixture of hydrocarbons after it has been freed from the unreacted aromatic compounds, and then subjecting the alkyl aryl sulfonate mixture to processes involving evaporation and/or extraction to remove unsulfonated organic material in the mixture.

The compositions may be prepared in the form of oily pastes by first making the dry compositions and then adding to these compositions hydrocarbon materials and/or dry cleaning solvents.

The mixed aromatic sulfonates of the invention are preferably prepared in the form of their sodium salts, but they also may be prepared in the form of salts of other basic atoms or groups. For example, they may be prepared in the form of other alkali metal salts, alkaline earth metal salts, ammonium salts, or salts in which the acidic groups are neutralized by organic bases, such as mono-, di-, or triethanolamine, pyridine, ethylenediamine, amylamine, and triethylenetetramine. If the salt-forming basic component is polyacidic, it may be neutralized in part with the mixed aromatic sulfonic acids and in part by other acidic materials which preferably possess detergent characteristics.

In order that the invention may be understood more fully, reference should be had to the following examples in which is described the preparation of preferred compositions coming within the scope of the present invention. The parts are by weight and the temperatures are in degrees centigrade:

*Example 1.*—385 parts of white oil—a purified colorless liquid petroleum distillate with a specific gravity of 0.849 at 22°, 90 per cent of which distilled from 215° to 285° at 25 mm. pressure and which, on the basis of these properties, was regarded as comprising a hydrocarbon mixture in which the molecular carbon content of the hydrocarbons ranged from 20 to 28 carbon atoms and averaged 22 to 23 carbon atoms—were chlorinated at a temperature between 60° and 65° with chlorine gas with the influence of diffused daylight, until the chlorinated mass contained 60 parts of organically combined chlorine. This corresponds to 139 per cent of monochlorination. The chlorinated white oil was added to an agitated mixture of 20 parts of anhydrous aluminum chloride and 225 parts of benzene, and the mixture was stirred for one hour between 25° and 30° and one hour between 45° and 55°. The mixture was then allowed to stand 16 hours. It separated into two layers. The upper layer was decanted, washed with an equal volume of a two per cent aqueous hydrochloric acid solution, and distilled until the boiling point of the residual mixture was 100° at 20 mm. mercury pressure (to remove chiefly unreacted benzene). The residual oil was characterized by an amber color and a slight bloom. Approximately 25 per cent of this oil distilled below 205° at 5 mm. pressure. The remainder was chiefly nuclearly alkylated benzenes in which the alkyl groups had an average carbon content of 22 to 23 carbon atoms and corresponded with the average molecular carbon content of the hydrocarbons in the white oil.

65 parts of the residual oil were diluted with 12 parts of Stoddard solvent (Dept. of Commerce Bulletin-Commercial Standard CS. 3–28), and, to the rapidly agitated mixture, 16 parts of chlorsulfonic acid were added slowly while the temperature of the reacting mass was maintained, by indirect cooling, between 10° and 15°. The mixture then was agitated, without cooling, for two hours after evolution of hydrogen chloride from the mixture had subsided. To the resulting mass an aqueous fifty per cent caustic soda solution was added until the resulting pasty mass was basic to Congo Red paper and neutral to Brilliant Yellow paper. It was then diluted with 8.5 parts of water and thoroughly mixed. The paste finally obtained dispersed easily in Stoddard solvent and in chlorinated dry cleaning solvents, such as carbon tetrachloride and trichlorethylene. Mixtures of this paste with Stoddard solvent, which contained five volumes or less of the paste per 100 volumes of the mixture, appeared turbid by reflected light, but were substantially optically clear by transmitted light. Stable dispersions in any proportions of this paste and Stoddard solvent or other equivalent dry cleaning solvent could be made by agitating the paste with the solvent.

50 parts of this paste were diluted with 33 parts of Stoddard solvent. The resulting oily paste could be diluted further with water, and did not stratify until the diluted mixture contained more than 50 per cent water. The non-stratified water-diluted paste dispersed easily in Stoddard solvent. Two parts by volume of the said diluted paste (containing about 30 per cent by volume of water) in 100 parts by volume of Stoddard solvent were somewhat turbid, but were very stable and did not stratify even on standing for 24 hours, notwithstanding the presence of the water.

*Example 2.*—Paraffin oil (known in the trade as "Ambrex D" and characterized by a pour test of 25, an A. P. I. gravity degree of 29=specific gravity 0.88 at 15°, a molecular weight, by freezing point method, of about 370, and 80 per cent of which distilled from 195° to 280° at 10 mm. pressure—corresponding to an average hydrocarbon molecule with about 26 carbon atoms) was chlorinated in diffused daylight with chlorine gas at a temperature between 80° and 95° until the weight of organically combined chlorine was 24 to 25 per cent of the weight of the chlorinated mixture.

A mixture of 225 parts of this chlorinated hydrocarbon mixture, 150 parts of phenetole and 15 parts of anhydrous aluminum chloride was agitated and maintained for about 2 hours at a temperature between 50° and 60°, then it was allowed to settle for about 16 hours. The upper layer was then washed twice with water, and distilled until all the unreacted phenetole was removed (i. e., until the boiling point of the residue reached about 135° at 20 mm. mercury pressure). The residue consisted of a brown oil which comprised mainly a mixture of higher alkyl phenetoles, in which the alkyl groups were derived from the paraffin oil.

The latter brown oil was sulfonated in the presence of Stoddard solvent, neutralized with 50 per cent aqueous caustic soda and diluted with water, in the manner described in Example 1. The resulting product was a heavy oil adapted for use as a dry cleaning paste. 5 parts by volume of this oil mixed with 95 parts by volume of Stoddard solvent formed a mixture which was substantially optically clear by transmitted light. The cleaning paste, when diluted with water until it contained 45 per cent of water by weight, did not stratify, and 2 per cent solutions by volume of the diluted paste (containing about 45 per cent by volume of water) in Stoddard solvent were almost optically clear and formed excellent dry cleaning compositions which did not water-spot goods cleaned therewith.

*Example 3.*—150 parts of the chlorinated white oil prepared in the manner described in Example 1, 70 parts of phenol and 10 parts of anhydrous zinc chloride were agitated and heated to a temperature of 135° and maintained there for about 5 hours. After standing for about 15 hours, the upper layer of oil was decanted from the tarry heel and distilled in vacuo until the boiling point of the residue reached a temperature of 135° at 5 mm. mercury. The residue was a brown oil and consisted of a mixture of unreacted white oil and alkylated phenols.

To a mixture of 50 parts of the residual brown oil and 6 parts of Stoddard solvent, 12 parts of chlorsulfonic acid were added, while the temperature of the reacting mass was maintained between 8° and 12°. The mass was agitated for two hours, then made neutral to Brilliant Yellow paper with a 50 per cent aqueous caustic soda solution. The resulting paste was miscible with Stoddard solvent in all proportions, and the mixtures so formed which contained 5 per cent or less by volume of the paste were turbid by reflected light and almost optically clear by transmitted light. The dilute mixtures became more turbid as their content of paste was increased.

The paste, diluted with water until it contained 45 per cent by weight of water, did not stratify; and solutions in Stoddard solvent of the water-diluted paste, containing 2 per cent or less by volume of the diluted paste, were only slightly turbid.

*Example 4.*—Chlorine was passed into 300 parts of a petroleum white oil which boiled from 210° to 285° at 25 mm. pressure and had a probable average composition corresponding with the empirical formula $C_{23}H_{48}$, while maintaining the temperature at 50°. To facilitate the reaction, the reaction mixture, which was contained in a glass reaction vessel, was subjected to actinic light during the treatment with chlorine and was well agitated. The introduction of chlorine was discontinued when the reaction mixture had increased in weight about 33 parts, about 1.5 hours being required, and the agitation was continued thereafter for about fifteen minutes. (The increase in weight of about 33 parts corresponds substantially with the theoretical increase in weight for the formation of the mono-chloride.) 200 parts of the resulting chlorinated white oil, 200 parts of phenol and 35 parts of anhydrous zinc chloride were heated at 170° while being agitated in a vessel provided with a reflux condenser. After about 5 hours the heating was discontinued and the mixture allowed to cool. The oily product was decanted from the zinc chloride and fractionally distilled in vacuo. The distillate boiling from 240° to 300° at 3 mm. pressure was separately collected. 100 parts of this distillate were treated with 222 parts of 66° Bé. sulfuric acid at 95° for 1 hour. The sulfonation mix was then poured into water and made neutral to delta paper with caustic soda. (Caustic potash or other equivalents can be used.) The neutral solution was evaporated to dryness.

*Example 5.*—Chlorine was passed into 375 parts of a white oil (purified colorless petroleum distillate) which had a specific gravity of 0.843 at 25°, of which 90 per cent distilled from 215° to 285° at 25 mm. pressure and which on the basis of its properties was regarded as comprising a hydrocarbon mixture in which the molecular carbon content of the hydrocarbons ranged from 20 to 28 carbon atoms and averaged 23 to 24 carbon atoms. The white oil contained 0.1 part of iodine as a chlorination catalyst and was maintained at a temperature between 55° and 60°. The chlorination was discontinued when the chlorinated mass contained 50 parts of organically combined chlorine. A mixture of 150 parts of benzene and 21 parts of anhydrous aluminum chloride was agitated while 300 parts of this chlorinated white oil were added the mixture being maintained at a temperature of 25° to 30° for one hour and then at 50° to 55° for about one hour. The resulting mixture was allowed to separate into two layers. The upper layer was decanted and washed with 200 parts of a 10 per cent aqueous solution of sodium bisulfite. It was then washed twice, with 200 parts of water each time. The decanted oil mixture was distilled under a pressure of 25 mm. of mercury until the unreacted benzene was removed (i. e., until the boiling point of the residue reached 125° at 20 mm. mercury pressure). The residue consisted of a light amber-colored oil which comprised chiefly a mixture of higher alkyl benzenes, in which the alkyl groups had an average carbon content of 23 to 24 carbon atoms, and some original white oil.

50 parts of the residual oil were sulfonated with 8 parts of chlorsulfonic acid, the reaction mixture being maintained at a temperature between 12° and 15° during addition of the acid. The sulfonating mixture was agitated for 16 hours without cooling. The resulting mass was diluted with 18 parts of water and neutralized to delta paper with 50 per cent aqueous caustic soda solution. The mixture was diluted with 58 parts of Stoddard solvent to form an oily paste containing approximately 20 per cent sodium alkyl benzene sulfonates.

The oily paste can be diluted further with water, and will not stratify until the diluted mixture contains more than 70 parts of water or less than 8 parts of sodium alkyl benzene sulfonates. The water-diluted paste disperses readily in Stoddard solvent, giving a slightly turbid but relatively stable emulsion.

*Example 6.*—Paraffin oil of the type known commercially as "white oil," having a specific gravity of about 0.848, and boiling range of approximately 224° to 278° at 15 mm. mercury pressure, an average molecular carbon content of 26 carbon atoms (determined by the cryoscopic method), and, on the basis of its source and properties, considered to be a mixture of hydrocarbons ranging in carbon content from about 22 to 28 carbon atoms per molecule, was chlorinated in a lead-lined vessel by passing chlorine gas into the oil at about 75° in the presence of about 0.05 per cent of iodine as catalyst until a gain in specific gravity of 0.09 had been realized. The resulting chlorinated oil contained approximately 1.3 times the amount of organically combined chlorine required for monochlorination of the hydrocarbons in the white oil. 300 parts of the resulting chlorinated white oil were added to an agitated mixture, maintained at about 25° to about 30°, of 21 parts of anhydrous aluminum chloride and 150 parts of benzene. Hydrogen chloride gas was evolved. The mixture was agitated at about 25° to about 30° for one hour and then at 45° to 50° for one hour. The mixture was then allowed to stand for 16 hours. Two layers formed; a brown, mobile oily upper layer and a black, tarry, more viscous lower layer. The upper layer of brown mobile oil was decanted, washed with a 5 per cent aqueous NaHSO₃ solution, and distilled until volatile components boiling up to 100° at 4 mm. were removed. The residue of the distillation was about 200 parts of an amber oil comprising chiefly alkylated benzenes in which the alkyl groups ranged from about 22 to 28 in carbon content and averaged about 26 carbon atoms. 200 parts of the oil were sulfonated by slowly adding thereto 48½ parts of chlorsulfonic acid while the mixture was maintained at about 20° to about 25°. Thereafter the mixture was stirred for about 2 hours until 1 part of a test portion, after being neutralized with caustic soda, was soluble in 20 parts of water. The mixture was then diluted with about 4 parts of water, made neutral to Brilliant Yellow by addition of concentrated aqueous caustic soda, and dried. The resulting product was a practically yellowish solid which was clearly soluble in water to give almost colorless solutions, and which was soluble in dry cleaner's naphtha, carbon tetrachloride, trichlorethylene and the like dry cleaning solvents.

*Example 7.*—To a three-neck glass flask equipped with agitator, thermometer, and gas inlet and outlet tubes, there were charged 500 parts of a white oil (a purified colorless petroleum distillate) having a specific gravity of 0.844 at 24° and of which 90 per cent distilled from 215° to 285° at 25 mm. of mercury absolute pressure, and 0.2 gram of iodine. Agitation was started and the white oil was heated to 80° to 82°. Chlorine gas was passed into the liquid at a rate of about 1.2 parts per minute until the gain in weight of the oil, after aerating, was 74 parts and the specific gravity at 24° increased 0.0896.

To a three-neck glass flask equipped with thermometer, agitator, dropping funnel, and condenser, there were charged 500 parts of benzene and 50 parts of anhydrous aluminum chloride. Agitation was started and 500 parts of this chlorinated white oil were added at room temperature over 20 minutes. The temperature of the condensation mixture was raised to 45° in 10 minutes and held at 44° to 46° for 90 minutes. The condensation mass was allowed to stand in a separatory funnel for about 16 hours, after which the lower layer which formed, a black tarry mass, was drawn off. The remaining oil was distilled until the distilland had a boiling point of 90° at 15 mm. pressure. The residual oil (408 parts) while still hot was treated with 10 parts of "Tonsil" clay (an impure kaolin which had been activated by treatment with dilute mineral acid) for about 5 minutes and filtered. The filtered oil, alkyl substituted benzenes, thus obtained weighed 352 parts.

300 parts of the resulting oil were charged to a three-neck flask equipped with agitator, thermometer, and dropping funnel. Then 549 parts of 100 per cent sulfuric acid were added to the well-agitated oil at room temperature. The mixture was agitated for 10 minutes at room temperature (30°) and then at 55° to 60° for one hour. 261 parts of cold water were added to the mixture which was maintained with cooling at a temperature not exceeding 60°. Then 850 parts of Stoddard solvent were added. The mixture was agitated for 15 minutes while warming to 50° and allowed to stand about 16 hours. A separated bottom layer of sulfuric acid was withdrawn. To the remaining material, 27 parts of "butyl cellosolve" (butylether of ethylene glycol) were added, and the mixture was neutralized with 120 parts of water plus 57 parts of 50 per cent aqueous caustic soda solution. Because the neutralization takes place slowly, the batch was agitated over night to reach equilibrium. Then 44 parts of white oil were added. To 1405 parts of the resulting mixture 19 parts of "butyl cellosolve" and 76 parts of a 33 per cent aqueous trisodium citrate solution were added. After the whole mixture was made uniform by thorough mixing, 1.5 parts (equal to 0.1 per cent by weight) of triethanolamine were added thereto.

*Example 8.*—A Midland, Michigan, crude oil distillate which boiled above 165° at 4 mm. of mercury absolute pressure was fractionated, and the portion boiling between 165° and 170° at 4 mm. of mercury absolute pressure was collected. This fraction was refractionated and the portion which distilled from 165° to 170° at 4 mm. of mercury absolute pressure was collected. (This fraction would have a boiling range of about 195° to about 200° at 15 mm. of mercury absolute pressure.)

The above described fraction which distilled between 165° and 170° at 4 mm. was acid washed as follows. 453 parts of the fraction were agitated at 50° to 55° for one hour with about 84 parts of 100 per cent sulfuric acid. After allowing the mixture to stand for about ½ hour, the lower layer of acid was withdrawn and discarded. The remaining layer of acid treated oil was again treated at room temperature, but otherwise in the same way, with two further successive portions of 100 per cent sulfuric acid amounting to about 74 parts and 69 parts, respectively. The treated petroleum fraction was then agitated at room temperature for 15 minutes with 10 parts of Tonsil (an activated clay) and finally filtered.

314 parts of this refined petroleum fraction which had a specific gravity of 0.815 at 24° were agitated in a glass flask fitted with a glass agitator. 0.12 part of iodine was dissolved in the agitated hydrocarbon mixture which was held at 60° to 62° while a stream of chlorine gas was passed into the liquid at a rate of 2.5 parts per minute for 38 minutes. The glass flask containing the agitated refined petroleum fraction was exposed to the light of a 100-watt lamp throughout the chlorination period. After stopping the stream of chlorine gas, a current of air was passed through the chlorinated hydrocarbon mixture for 8 minutes to remove dissolved hydrogen chloride and unreacted chlorine. The chlorinated hydrocarbon mixture weighed 359 parts and had a specific gravity of 0.899 at 24°. The amount of organically combined chlorine was estimated to amount to 117 per cent of the amount which would be theoretically required to convert all the hydrocarbon molecules of the hydrocarbon mixture into their monochlor substitution derivatives.

359 parts of the chlorinated hydrocarbon mixture prepared as described above were added at room temperature during 20 minutes to an agitated mixture of 718 parts of benzene and 18 parts of anhydrous aluminum chloride. The agitated reaction mixture was warmed to 45° during the course of 5 minutes and held at 44° to 46° for 90 minutes. Thereafter, the mixture was allowed to settle at room temperature for 4 hours and a lower layer of tar weighing 92 parts was drawn off and discarded. The remaining crude hydrocarbon condensation product was agitated for 15 minutes at room temperature with 25 parts of Tonsil (an activated clay) and filtered.

The crude condensation product was distilled fractionally. The distillation was commenced at atmospheric pressure, and as it progressed, pressure in the distilling apparatus was reduced by stages, and finally to 4 mm. of mercury absolute pressure. The fraction of distillate which was collected between 180° and 270° under 4 mm. of mercury absolute pressure was refractionated, using a Widmer column. The fraction boiling at 205° to 210° under 4 mm. of mercury absolute pressure weighed 87 parts and was collected separately for sulfonation. This fraction consisted substantially entirely of a mixture of alkyl benzene hydrocarbons.

87 parts of the mixture of alkyl benzene hydrocarbons prepared as described above were agitated at room temperature with about 8.5 parts of 100 per cent sulfuric acid for one-half hour. After allowing the mixture to stand for a half hour, the lower acid layer was drawn off and discarded. To the agitated remaining acid-washed mixture of alkyl benzene hydrocarbons, 105 parts of 100 per cent sulfuric acid were added at room temperature. The temperature of the mixture was then raised to 55° to 60° and thereafter agitation was continued for one hour. Then the mixture was allowed to stand for one hour; the lower acid layer was drawn off and discarded; the upper organic sulfonic acid layer was treated with 11 parts of ice, and the mixture was allowed to stratify by standing for one hour. A lower layer of spent sulfuric acid was withdrawn and discarded. The remaining organic sulfonic acid layer was neutralized with about 59 parts of a 50 per cent aqueous solution of caustic soda and the aqueous mixture was dried on a drum drier heated internally with steam at about 60 pounds gauge pressure. The dried product weighed 139 parts and contained 96.5 parts of sodium salt of organic sulfonate. The dried product can be used to prepare dry cleaning baths of high cleaning power.

It will be understood that the foregoing examples are merely illustrative of the manner in which the present process may be practiced. For example, instead of the petroleum fractions employed in the examples there may be used other petroleum fractions of the class hereinbefore defined. Also, other mononuclear aromatic compounds, such as, for example, one of those mentioned above, may be used in place of the compounds used in the examples, to produce compositions of similar properties.

The sulfonation may be carried out with the aid of heating or cooling, as required, depending upon the ease of sulfonation of the substituted aromatic compound. As sulfonation assistants there may be employed the lower organic acids and/or their anhydrides, as, for example, acetic acid, acetic anhydride, etc. The sulfonation may be carried out to an extent such that mainly one, or more or less than one, sulfonic acid group is present in the final product (based on the substituted aromatic compound). In general, when the compositions are to be used in producing water-in-oil emulsions or in dry cleaning, the extent of sulfonation is preferably less than that necessary for complete monosulfonation since under-sulfonated products show better water-dispersing action.

It is to be understood that the invention includes compositions containing products in which a plurality of alkyl and/or cycloalkyl aryl sulfonic acid nuclei are linked together through the sulfonic acid groups by a polyvalent metal or organic base radical, as well as compositions in which an alkyl and/or cycloalkyl aromatic sulfonic acid is linked through the sulfonic acid group to a different acid compound, preferably a compound of detergent nature, by a polyvalent metal or organic base radical.

Thus, the invention comprehends compositions containing mixtures of compounds of the type $(Z)_n$—M—$(Z')_n$ and $(Z)_n$—M—$(Y)_n$, wherein Z and Z' each represent an alkyl or cycloalkyl aryl sulfonic acid nucleus, which may be the same or different, in which the alkyl and/or cycloalkyl groups are residues of aliphatic and/or alicyclic hydrocarbons present in a petroleum fraction of the type defined above and the aryl residue is mononuclear, M represents a polyvalent metal or organic base, Y represents a radical containing an acid group, and $n$ represents a whole number. Examples of such types of compounds are:

Z—Mg—Z'
Z—NH$_3$—CH$_2$CH$_2$—NH$_3$—Z'
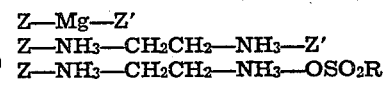
and
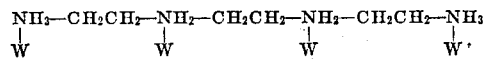

wherein Z and Z' have the meaning given above, R represents a higher alkyl radical, and W represents a radical containing an acid group, at least one of which is a radical of the type represented by Z.

From the foregoing description it will be seen that the present invention provides a valuable class of compositions which may be manufactured in an economical manner from readily available and inexpensive raw materials. The compositions are able to disperse a relatively large amount of water as the internal phase of a water-in-dry cleaning solvent emulsion, and they impart advantageous detergent powers to their solutions in dry cleaning solvents. They are, therefore, particularly desirable as constituents of dry cleaning baths which contain emulsified water and are used for removing simultaneously dirt which is insoluble, soil which is soluble in organic solvents, soil which is soluble in water, and soil which is softened by organic solvents or water. Such emulsions may contain up to about 1 per cent by weight of water without any separation of water globules in the mixture upon standing for twenty-four hours. The said emulsions are excellently suited for dry cleaning and can be used for removing simultaneously oil-soluble and water-soluble stains from delicate fabrics without fear of water-spotting.

The effective action of the compositions of the invention in dry cleaning mixtures containing water appears to be due to the fact that the aromatic sulfonates are jointly soluble in the dry cleaning solvents and the water, and exhibit dispersing action in both water and the solvents. Inasmuch as the water solutions of the mixed aromatic sulfonic acid compounds in the form of their alkali metal salts are neutral in reaction, dry cleaning mixtures containing water and the mixed aromatic sulfonates may be used safely for the cleaning of delicate white and dyed silks and other fine fabrics without fear of the undesirable changes in dye shades and color tones which often accompany the use of detergent compositions in dry cleaning baths.

The compositions of the invention which contain residual high molecular, unchlorinated, oily hydrocarbons have the additional advantage of imparting a soft, smooth feel to fabrics which are cleaned in dry cleaning baths containing the compositions, which appears to be due to the fact that a small amount of the oily hydrocarbons are retained by the cleaned fabrics.

One of the outstanding characteristics of the compositions of the invention when used in dry cleaning is their ability to achieve excellent cleaning action in low concentrations. Thus, satisfactory dry cleaning mixtures which are applied for dry cleaning soiled fabric such as dress goods may be prepared containing a weight ratio of sulfonic acid salt to dry cleaning solvent of less than 0.3 to 100, while in order to prepare dry cleaning mixtures which are to be employed, for example, as spotting solutions or for cleaning gloves, hats, and the like, it is seldom necessary to use a weight ratio in excess of 5 to 100, and in most cases a ratio of 3 to 100 or less is satisfactory. Further, by their advantageous emulsifying action the compositions of the invention hold the dirt particles removed from the material undergoing cleaning in suspension in the dry cleaning solvent and prevent their redeposition. This is particularly advantageous in cleaning white fabrics, graying thereby being greatly reduced.

The compositions of the present invention can be used in dry cleaning various materials by various procedures. Thus they can be used as assistants or substitutes for the usual dry cleaning soaps or pastes in dry cleaning baths, including the single bath and multiple bath methods of operations, and they can be employed in spotting and brushing compositions. In accordance with the usual practice in dry cleaning, the amounts of the compositions employed will vary with the degree of soil of the material being cleaned. In general, to effect an equal cleansing action, lesser amounts of the compositions of the present invention are required than are required in the cases of dry cleaning soap compositions heretofore known. By reason of the neutral reaction of the alkali metal salts of the sulfonic acids employed in accordance with the present invention, said compositions can be used for the cleaning of fibers and fabrics of all types including woolens, silks, artificial silks, leather, etc. The compositions, by reason of their solubility in the dry cleaning solvents, can be employed in dry cleaning apparatus involving a filtering system without building pressure in the filters.

Water in limited amounts is advantageously used in the dry cleaning of fabrics with the aid of the compositions of the present invention. The products of this invention give excellent dispersions of water in oil which, when incorporated in a dry cleaning bath, avoid water-spotting of goods. As is known in the art, the amount of water employed should not be such as to cause serious wrinkling or shrinking of the goods and varies with the nature of the goods being cleaned. The invention makes possible the preparation of compositions in the form of pastes containing water in addition to the substituted aromatic sulfonates, so that upon addition to dry cleaning solvents, effective cleansing action is secured. The presence of water in the bath effects not only the known loosening and dissolving action on soil which is softened or dissolved by water but which is insoluble in the solvent, but it serves the additional important function of enhancing the cleansing action of the substituted aromatic sulfonates. Further, the presence of water in the paste composition makes possible the incorporation of additional water into dry cleaning baths in the form of water-in-oil emulsions.

For the preparation of pastes which are to be employed in the cleansing of light silk fabrics, the maximum content of water in a composition of the type of that of Example 7 is preferably about 15 per cent by volume of the composition. For the preparation of pastes which are to be employed for the cleansing of dark woolen goods, water may be incorporated into such paste compositions in amounts equal to 80 to 100 per cent by volume of the paste composition.

The paste composition of Example 7 contains butyl cellosolve, sodium citrate and triethanolamine, in addition to the mixture of substituted benzene sulfonates, unattacked petroleum hydrocarbons, and water. The butyl cellosolve is employed for the purpose of making possible the ready incorporation of additional water. It is preferably employed in small amounts, e. g., 0.5 to 3 parts per 100 parts by weight of the paste composition. In addition to imparting to the paste compositions the property of mixing readily with water, it improves the clarity and stability of the paste compositions themselves. Instead of butyl cellosolve, small amounts can be used of other organic compounds which contain at least one group tending to impart to the compound solubility in water and at least one alkyl group tending to impart to the compound solubility in a hydrocarbon solvent, the solubilizing influence of these two types of groups being so balanced that one is not greatly different from the other. In general the water-solubilizing group may be selected from the group consisting of hydroxyl and various combinations of hydroxyl with ether and/or ester groups. Preferably the alkyl group is a butyl or amyl group. Representative compounds of this type are the following:

Amyl alcohol, $C_5H_{11}OH$
Dibutyl tartrate, $C_4H_9OCO$—
$\quad\quad\quad\quad\quad CHOH$—$CHOH$—$COOC_4H_9$
Butyl lactate, $C_4H_9OCO$—$CHOH$—$CH_3$
Butyl carbitol, $C_4H_9OCH_2CH_2OCH_2CH_2OH$
Capryl alcohol, $C_8H_{17}OH$ The sodium citrate employed in the paste composition of Example 7 serves to insure that said paste will not change into oil-in-water dispersions when admixed with water. Effective amounts have been found to be from about 1 to about 4 parts of sodium citrate per 100 parts by weight of the paste composition. Instead of the sodium citrate, similar amounts of practically any of the common water-soluble sodium salts may be used; for example, sodium chloride, sodium sulfate and disodium phosphate. Sodium chloride is less desirable, however, since its effect is somewhat more critical and the presence of an excess over the optimum amount thereof tends to cause separation of the paste into layers during storage. Further, sodium sulfate is not preferred because of its tendency to crystallize in the anhydrous state when paste compositions containing it are cooled to low temperatures over long periods of time, even though water is present.

The triethanolamine employed in the paste composition of Example 7 serves as a corrosion inhibitor. The presence of dispersed water in paste compositions of the above type has been found to cause corrosion of sheet metal containers, e. g., drums, in which the pastes are usually marketed. It is possible to control corrosion by adding small amounts of known corrosion inhibitors, such as triethanolamine, to the pastes. It is usually preferable, however, to use such inhibitors in restricted amounts as otherwise they frequently have an adverse effect on the ability of the pastes to disperse water in the dry cleaning bath. It has been found that this corrosiveness can be greatly reduced during manufacture of the pastes by removing aluminum-containing compounds from the condensation product of the halogenated petroleum fraction with the aryl compound, before proceeding to the sulfonation step. In Example 7, the white oil-benzene condensation product was freed of harmful aluminum compounds by a treatment with "Tonsil" clay in the manner described. In compositions of the type of Example 7, produced by a process including the "Tonsil" clay treatment, the use of more than 0.1 per cent of triethanolamine to control corrosion is unnecessary.

Since certain changes may be made in the compositions and processes herein described without departing from the scope of the invention, it is to be understood the above description shall be taken as illustrative and not in a limiting sense.

The present application is a continuation-in-part of my application Serial No. 186,733, filed January 24, 1938, which is a continuation-in-part of my applications Serial Nos. 691,082, filed September 26, 1933; 737,777, filed July 31, 1934; and 42,164, filed September 25, 1935.

I claim:

1. A mixture of substituted mononuclear aryl sulfonates which contain as nuclear substituents aliphatic and alicyclic hydrocarbon radicals derived from a liquid fraction of petroleum of which at least 80 per cent boils within the range from 195° to 295° C. at 15 mm. pressure.

2. A mixture of substituted mononuclear aryl sulfonates which contain as nuclear substituents aliphatic and alicyclic hydrocarbon radicals derived from a liquid fraction of petroleum of which at least 80 per cent boils within the range from 195° to 295° C. at 15 mm. pressure and over a maximum range of 40° C.

3. A mixture of substituted benzene sulfonates which contain as nuclear substituents aliphatic and alicyclic hydrocarbon radicals derived from a liquid fraction of petroleum of which at least 80 per cent boils within the range from 195° to 295° C. at 15 mm. pressure.

4. A mixture of substituted benzene sulfonates which contain as nuclear substituents aliphatic and alicyclic hydrocarbon radicals derived from a liquid fraction of petroleum of which at least 80 per cent boils within the range from 195° to 295° C. at 15 mm. pressure and over a maximum range of 40° C.

5. A mixture of substituted phenol sulfonates which contain as nuclear substituents aliphatic and alicyclic hydrocarbon radicals derived from a liquid fraction of petroleum of which at least 80 per cent boils within the range from 195° to 295° C. at 15 mm. pressure.

6. A composition of matter comprising a mixture of substituted mononuclear aryl sulfonates which contain as nuclear substituents aliphatic and alicyclic hydrocarbon radicals derived from a liquid fraction of petroleum of which at least 80 per cent boils within the range from 195° to 295° C. at 15 mm. pressure, and hydrocarbons contained in said petroleum fraction, said mixture of sulfonates being obtained by a process comprising condensing a mononuclear aromatic compound with an incompletely halogenated mixture of hydrocarbons contained in such a petroleum fraction, and sulfonating the mixture of substituted aromatic compounds resulting from the condensation while in admixture with unattacked hydrocarbons remaining from the halogenation.

7. A composition of matter comprising a mixture of substituted sodium benzene sulfonates which contain as nuclear substituents aliphatic and alicyclic hydrocarbon radicals derived from a petroleum white oil boiling within the range from 195° to 295° C. at 15 mm. pressure, and hydrocarbons contained in said petroleum fraction, said composition of matter being obtained by the process comprising condensing benzene with an incompletely chlorinated petroleum white oil boiling within the range from 195° to 295° C. at 15 mm. pressure, sulfonating the mixture of substituted benzenes resulting from the condensation while in admixture with unattacked hydrocarbons remaining from the chlorination, and neutralizing the resulting sulfonation product with caustic soda.

8. The process for the preparation of mixtures of substituted mononuclear aryl sulfonates which comprises condensing a mononuclear aromatic compound with halogen derivatives of mixed hydrocarbons contained in a liquid fraction of petroleum of which at least 80 per cent boils within the range from 195° to 295° C. at 15 mm. pressure, to form a condensation mixture containing a mixture of derivatives of said aromatic compound which have as nuclear substituents residues of aliphatic and alicyclic hydrocarbons present in said petroleum fraction, and sulfonating said mixture of derivatives of said aromatic compound.

9. The process for the preparation of mixtures of substituted mononuclear aryl sulfonates which comprises condensing a mononuclear aromatic compound with chlorine derivatives of mixed hydrocarbons contained in a liquid fraction of petroleum of which at least 80 per cent boils within the range from 195° to 295° C. at 15 mm. pressure, to form a condensation mixture containing a mixture of derivatives of said aromatic compound which have as nuclear substituents residues of aliphatic and alicyclic hydrocarbons present in said petroleum fraction, and sulfonating said mixture of derivatives of said aromatic compound.

10. The process for the preparation of mixtures of substituted benzene sulfonates which comprises condensing benzene with halogen derivatives of mixed hydrocarbons contained in a liquid fraction of petroleum boiling within the range from 195° to 295° C. at 15 mm. pressure, to form a condensation mixture containing a mixture of derivatives of benzene which have as nuclear substituents residues of aliphatic and alicyclic hydrocarbons present in said petroleum fraction, and sulfonating said mixture of derivatives of benzene.

11. The process for the preparation of mixtures of substituted phenol sulfonates which comprises condensing phenol with halogen derivatives of mixed hydrocarbons contained in a liquid fraction of petroleum boiling within the range from 195° to 295° C. at 15 mm. pressure, to form a condensation mixture containing a mixture of derivatives of phenol which have as nuclear substituents residues of aliphatic and alicyclic hydrocarbons present in said petroleum fraction, and sulfonating said mixture of derivatives of phenol.

12. The process for the preparation of compositions containing mixtures of substituted mononuclear aryl sulfonates and petroleum hydrocarbons which comprises chlorinating a liquid fraction of petroleum of which at least 80 per cent boils within the range from 195° to 295° C. at 15 mm. pressure until the amount of organically combined chlorine is not greater than that required theoretically for dichlorination of all of the hydrocarbons in the petroleum fraction, to form a mixture containing chlorinated hydrocarbons and unattacked hydrocarbons, condensing the chlorinated hydrocarbons with a mononuclear aromatic compound in the presence of the unattacked hydrocarbons and a Friedel-Crafts catalyst, and sulfonating a resulting condensation product while in admixture with said unattacked hydrocarbons.

13. The process for the preparation of compositions containing mixtures of substituted benzene sulfonates which comprises chlorinating a liquid fraction of petroleum which is relatively free from aromatic bodies, and of which at least 80 per cent boils within the range from 195° to 295° C. at 15 mm. pressure, until the amount of organically combined chlorine is not greater than that required theoretically for dichlorination of all of the hydrocarbons in the petroleum fraction, to form a mixture containing chlorinated hydrocarbons and unattacked hydrocarbons, condensing the chlorinated hydrocarbons with benzene in the presence of the unattacked hydrocarbons and a Friedel-Ccarfts catalyst, sulfonating a resulting condensation product while in admixture with said unattacked hydrocarbons, and neutralizing the resulting sulfonation mass.

14. The process for the preparation of a composition containing a mixture of substituted sodium benzene sulfonates which comprises passing chlorine gas into a liquid fraction of petroleum which is relatively free from aromatic bodies, and of which at least 80 per cent boils within the range from 195° to 295° C. at 15 mm. pressure, until the petroleum fraction contains an amount of organically combined chlorine not greater than that theoretically required for 125 per cent monochlorination of all of the hydrocarbons in the petroleum fraction, based on the average molecular carbon content of the hydrocarbons in the petroleum fraction, condensing benzene with the resulting chlorinated mass in the presence of aluminum chloride, separating the resulting condensation mass into two layers, removing excess benzene from the upper layer, sulfonating the remainder of the upper layer, and neutralizing the resulting sulfonation mass with aqueous sodium hydroxide.

15. The process for the preparation of mixtures of substituted mononuclear aryl sulfonates which comprises condensing a mononuclear aromatic compound with halogen derivatives of mixed hydrocarbons contained in a liquid fraction of petroleum of which at least 80 per cent boils within the range from 195° to 295° C. at 15 mm. pressure and over a maximum range of 40° C., to form a condensation mixture containing a mixture of derivatives of said aromatic compound which have as nuclear substituents residues of aliphatic and alicyclic hydrocarbons present in said petroleum fraction, distilling the condensation mixture and collecting a mixture of said derivatives of said aromatic compound as a distillate, and sulfonating said mixture of derivatives of said aromatic compound.

LAWRENCE H. FLETT.